(12) United States Patent
Lemke (10) Patent No.: US 9,741,186 B1
(45) Date of Patent: Aug. 22, 2017

(54) PROVIDING WIRELESS ACCESS TO A SECURE LOCK BASED ON VARIOUS SECURITY DATA

(71) Applicant: International Business Machines Corporation, Armonk, NY (US)

(72) Inventor: William A. Lemke, San Diego, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/254,534

(22) Filed: Sep. 1, 2016

(51) Int. Cl.
| G05B 19/00 | (2006.01) |
| G07C 9/00 | (2006.01) |
| H04L 29/06 | (2006.01) |
| H04L 9/32 | (2006.01) |

(52) U.S. Cl.
CPC ..... *G07C 9/00023* (2013.01); *G07C 9/00817* (2013.01); *H04L 9/3234* (2013.01); *H04L 63/0492* (2013.01); *H04L 63/108* (2013.01); *G07C 2009/00388* (2013.01)

(58) Field of Classification Search
CPC ............ G07C 9/00023; G07C 9/00817; G07C 9/00841; G07C 2009/00388
USPC .................................................. 340/5.2, 5.28
See application file for complete search history.

(56) References Cited

U.S. PATENT DOCUMENTS

| 6,161,005 A | 12/2000 | Pinzon et al. |
| 7,725,730 B2 * | 5/2010 | Juels .................... H04L 63/083 340/5.85 |
| 8,035,479 B2 | 10/2011 | Tran |
| 8,570,145 B2 | 10/2013 | Au et al. |
| 8,838,555 B2 * | 9/2014 | Von Kaenel ...... G06F 17/30241 340/990 |
| 2005/0206519 A1 | 9/2005 | Tsui et al. |
| 2006/0199541 A1 | 9/2006 | Luebke et al. |
| 2011/0314530 A1 * | 12/2011 | Donaldson ............. G06F 21/83 726/7 |
| 2013/0237193 A1 | 9/2013 | Dumas et al. |
| 2014/0051355 A1 | 2/2014 | Ahearn et al. |
| 2015/0181014 A1 | 6/2015 | Gerhardt et al. |
| 2016/0110530 A1 | 4/2016 | Chalmers et al. |

OTHER PUBLICATIONS

Robarts Stu, myPORT app unlocks doors and calls elevators for you, Dec. 5, 2014, News Atlas, http://newatlas.com/myport-building-access-app/35084.*
Woollaston Victoria, The smart lock that lets you open your front door using just your phone—and can even let in guests when you're not home, May 30, 2013, http://www.dailymail.co.uk/sciencetech/article-2333375/The-smart-lock-lets-open-door-using-just-phone—let-guests-youre-home.html.*

* cited by examiner

*Primary Examiner* — Carlos E Garcia (57) ABSTRACT

A remote security access procedure for granting access to a wirelessly controlled lock may include one of receiving an address location at a server to setup a temporary access, receiving a security question at the server required to be answered prior to the temporary access being granted, receiving a time window at the server for the temporary access to be granted, encrypting via the server an access credential comprising the address location, the security question and the time window, and transmitting from the server the encrypted access credential to a guest device.

20 Claims, 12 Drawing Sheets

```
RECEIVING A PHYSICAL LOCATION AT THE SERVER
502
↓
RECEIVING A FIRST BIOMETRIC INPUT AT THE SERVER
504
↓
RECEIVING A TIME WINDOW AT THE SERVER FOR ACCESS TO THE PHYSICAL LOCATION TO BE PROVIDED
506
↓
ENCRYPTING AT THE SERVER AN ACCESS CREDENTIAL COMPRISING THE PHYSICAL LOCATION, THE BIOMETRIC INPUT AND THE TIME WINDOW
508
↓
TRANSMITTING FROM THE SERVER THE ENCRYPTED ACCESS CREDENTIAL TO A FIRST DEVICE AND TO A SECOND DEVICE
510
↓
RECEIVING A SECOND BIOMETRIC INPUT AT THE SERVER (OR THE SECOND USER DEVICE)
512
↓
DETERMINING THAT THE FIRST BIOMETRIC INPUT AND THE SECOND BIOMETRIC INPUT ARE SIMILAR
514
↓
TRANSMITTING FROM THE SERVER TO THE FIRST DEVICE A MESSAGE INDICATING THE FIRST BIOMETRIC INPUT AND THE SECOND BOIMETRIC INPUT ARE SIMILAR (OR TRANSMITTING FROM THE SECOND USER DEVICE TO THE FIRST USER DEVICE THAT THE FIRST BIOMETRIC INPUT AND THE SECOND BIOMETRIC INPUT ARE SIMILAR)
516
↓
TRANSMITTING FROM THE FIRST DEVICE TO THE SERVER A MESSAGE AUTHORIZING THE SERVER TO TRANSMIT A KEY TO THE SECOND DEVICE; (OR TRANSMITTING THE KEY FROM THE FIRST DEVICE TO THE SECOND DEVICE)
518
↓
TRANSMITTING THE KEY TO THE SECOND DEVICE
520
↓
UNENCRYPTING, BY THE SECOND DEVICE, THE ENCRYPTED ACCESS CREDENTIAL USING THE KEY
522
↓
ACCESSING, BY THE SECOND DEVICE, THE PHYSICAL LOCATION VIA THE UNENCRYPTED ACCESS CREDENTIAL WHEN THE SECOND DEVICE IS PROXIMATE THE PHYSICAL LOCATION DURING THE TIME WINDOW
524
```

```
RECEIVING A PHYSICAL LOCATION AT THE SERVER
582
           │
           ▼
RECEIVING A FIRST BIOMETRIC INPUT AND SECURITY QUESTION AT THE SERVER
584
           │
           ▼
RECEIVING A TIME WINDOW AT THE SERVER FOR ACCESS TO THE PHYSICAL LOCATION TO BE PROVIDED
586
           │
           ▼
ENCRYPTING AT THE SERVER AN ACCESS CREDENTIAL COMPRISING THE PHYSICAL LOCATION, THE BIOMETRIC
INPUT, THE SECURITY QUESTION AND THE TIME WINDOW
588
           │
           ▼
TRANSMITTING FROM THE SERVER THE ENCRYPTED ACCESS CREDENTIAL TO A FIRST DEVICE AND TO A SECOND
DEVICE
590
           │
           ▼
RECEIVING A SECOND BIOMETRIC INPUT AT THE SERVER (OR THE SECOND USER DEVICE)
592
           │
           ▼
DETERMINING THAT THE FIRST BIOMETRIC INPUT AND THE SECOND BIOMETRIC INPUT ARE SIMILAR
594
           │
           ▼
DETERMINING THAT THE SECURITY QUESTION IS ANSWERED CORRECTLY
596
           │
           ▼
UNENCRYPTING, BY THE SECOND DEVICE, THE ENCRYPTED ACCESS CREDENTIAL WHEN IT IS DETERMINED THAT
THE FIRST BIOMETRIC INPUT AND THE SECOND BIOMETRIC INPUT ARE SIMILAR AND THE SECURITY QUESTION IS
ANSWERED CORRECTLY
598
           │
           ▼
ACCESSING, BY THE SECOND DEVICE, THE PHYSICAL LOCATION VIA THE UNENCRYPTED ACCESS CREDENTIAL
WHEN THE SECOND DEVICE IS PROXIMATE THE PHYSICAL LOCATION DURING THE TIME WINDOW
599
```

PROVIDING WIRELESS ACCESS TO A SECURE LOCK BASED ON VARIOUS SECURITY DATA

TECHNICAL FIELD

This application relates to providing temporary access to a secure environment and more particularly to providing remote access from a first device to a second device based on specified security information.

BACKGROUND

Security is being managed remotely through communication protocols which transmit commands from devices to other devices, such as lights, doors, security cameras, appliances, etc. In certain instances, remote access to a door lock is being utilized to permit certain visitors with access to a location/premise. However, these remote access examples only provide limited security and are not customizable to a particular owner of the location/premises.

SUMMARY

An example embodiment provides a method that includes at least one of accessing a security application and a security setup procedure, transmitting an address location to setup a temporary access, transmitting a security question required to be answered prior to access being granted, transmitting a time window for the temporary access to be enacted, encrypting an access credential comprising the address location, the security question and the time window, and transmitting the access credential to a guest device.

Another example embodiment includes a method that includes receiving an address location at a server to setup a temporary access, receiving a security question at the server required to be answered prior to the temporary access being granted, receiving a time window at the server for the temporary access to be granted, encrypting at the server an access credential comprising the address location, the security question and the time window, and transmitting from the server the encrypted access credential to a guest device.

Also another example embodiment may include an apparatus that includes a receiver configured to receive an address location to setup a temporary access, receive a security question required to be answered prior to the temporary access being granted, and receive a time window for the temporary access to be granted. The apparatus also includes a processor configured to encrypt an access credential comprising the address location, the security question and the time window, and a transmitter configured to transmit the encrypted access credential to a guest device.

Still another example embodiment includes a non-transitory computer readable storage medium configured to store instructions that when executed cause a processor to perform at least one of receiving an address location at a server to setup a temporary access, receiving a security question at the server required to be answered prior to the temporary access being granted, receiving a time window at the server for the temporary access to be granted, encrypting at the server an access credential comprising the address location, the security question and the time window, and transmitting from the server the encrypted access credential to a guest device.

DETAILED DESCRIPTION

It will be readily understood that the instant components, as generally described and illustrated in the figures herein, may be arranged and designed in a wide variety of different configurations. Thus, the following detailed description of the embodiments of at least one of a method, apparatus, and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Figure 1:
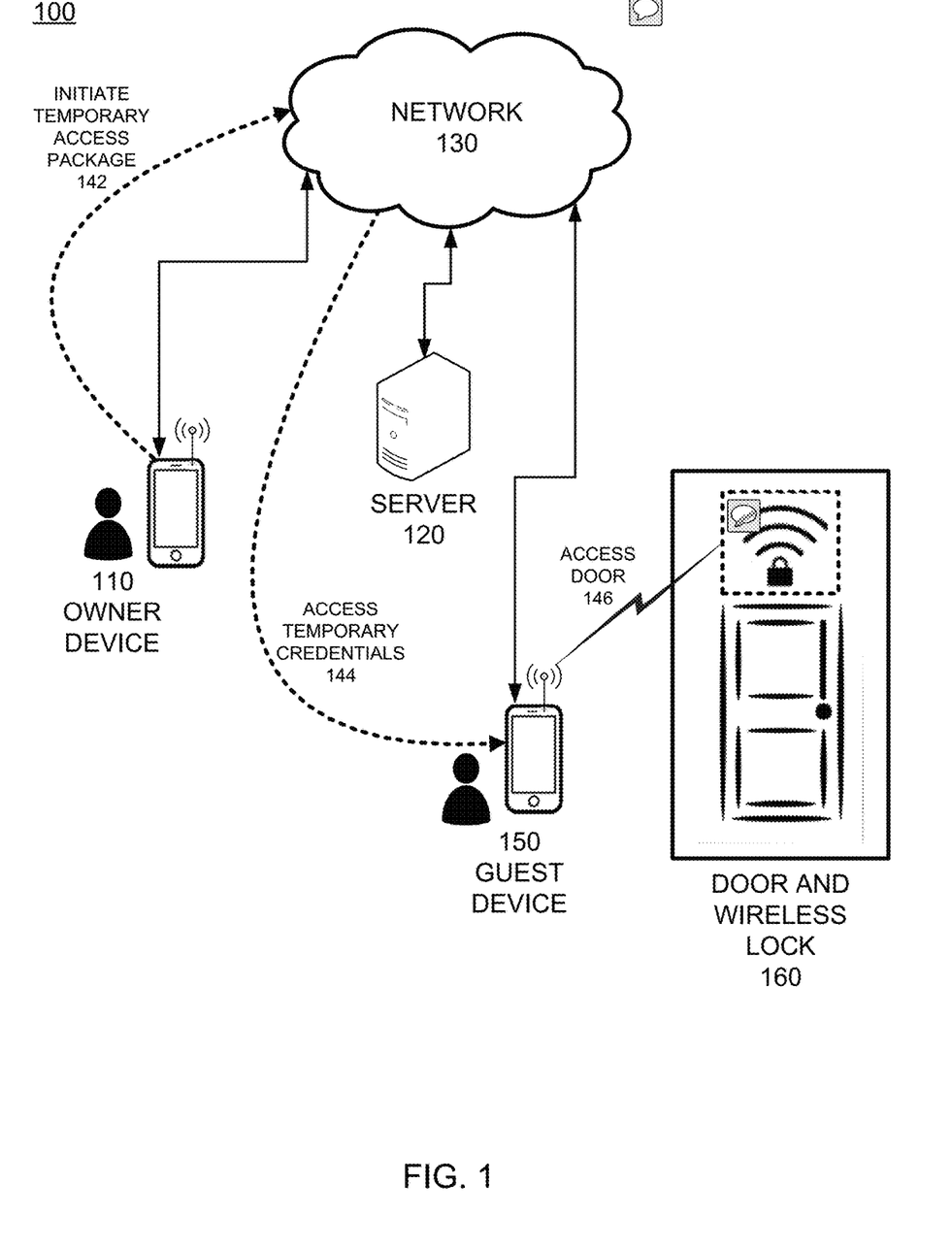
FIG. 1 illustrates an example communication network and a temporary access assignment according to an example embodiment.

FIG. 1 illustrates an example communication network and an access assignment according to an example embodiment. Referring to FIG. 1, the network 100 includes an owner device 110 which manages the access settings for the lock, a server 120 which hosts the security application and provides a log of registered users, command encryption and other features, and a guest device 150 which may receive access to the security premises based on the access permitted by the owner device 110. A network 130 provides a communication medium for the devices to communicate and may be part of the Internet, cloud or other known network comprising one or more computers, servers, etc. In another embodiment, at least one of managing the access settings for the lock, hosting the security application, and providing a log of registered users, command encryption and other features, can be performed by one or more of the owner device 110, the server 120, the network 130, the guest device 150, and the wireless lock 160.

In operation, in one embodiment, the owner device 110 may offer a temporary access schedule to one more guest devices 150. A time window for permitting access may be designated along with one or more of a security question and answer, a specific encryption key, a location tracking procedure, etc. The owner device 110 may set up such criteria and transmit a temporary access instance to the server 120. The entire set of data, or a portion of that data, may be deemed an access package 142 which is further processed by the application server 120 prior to offering access to the guest device 150. Credentials 144 may be offered to the guest device 150. Once the guest device 150 accesses the credentials and provides any needed information (e.g., answers to security questions, passwords, a SMS message confirmation, etc.), the guest device may be used to wirelessly access 146 the wireless lock 160 and thereby unlock an object such as a door. In one embodiment, the secure environment may be a space that is locked by a door or by some other locking mechanism that secures a space, device, appliance, equipment, or item of property. For example, various items may be secured by a lock and may need to be unlocked to provide temporary access such as bicycles, vehicles or other transports, luggage carriers (for example in airports or train stations), as well as appliances or equipment.

The access signal 146 may be sent to the door wirelessly in any manner such as a near field communication message, a BLUETOOTH message, a WiFi message, a cellular message, etc. In another embodiment, the access signal 146 may be sent to the server 120 which communicates with the wireless lock 160 over a device at a residence, office, or other building, such as a WiFi/Internet router. Ultimately, the access information necessary to open the door may be sent and processed into a command that enables the wireless lock to unlock and permit access to a structure. This access information and/or command may expire after a certain amount of time or after a certain action is taken (for example, after the lock is unlocked one or more times).

One example method of operation may include providing a near field access control interface to prevent opening of a lock controlling access to a property until conditions determined by the access control interface, or other communicably coupled device and/or software program, are satisfied. The interface may include a time/date for the access, a challenge response question, and an identification (which may include a serial number, international mobile equipment identity (IMEI) of a mobile device, a pre-shared key, and/or an encryption algorithm). Responsive to detecting the mobile device with the identification at the time/date in the vicinity of the lock, the challenge response may also be requested by the mobile device, and responsive to receiving a correct answer to the challenge response, the lock may be opened. The access control interface may require the authorized mobile device in the vicinity of the lock as monitored by GPS or other location determination procedures.

The security functions may include a time of day based access, denoted as 'T', a challenge response denoted as 'R', a serial number of the guest device denoted as SN', and a pre-shared key, denoted as 'K'. The key encryption method used to encrypt one or more of the security functions may be any standard encryption method. In operation, the property owner or occupant may have a BLUETOOTH, Wi-Fi, NFC, cellular, etc., based lock on an object on or in the property such as a door, gate, window, garage, attic, room, etc. which uses a mobile device and application to permit or limit access. The web site/server 120 stores a master database of keys which can open the lock.

Figure 2A:
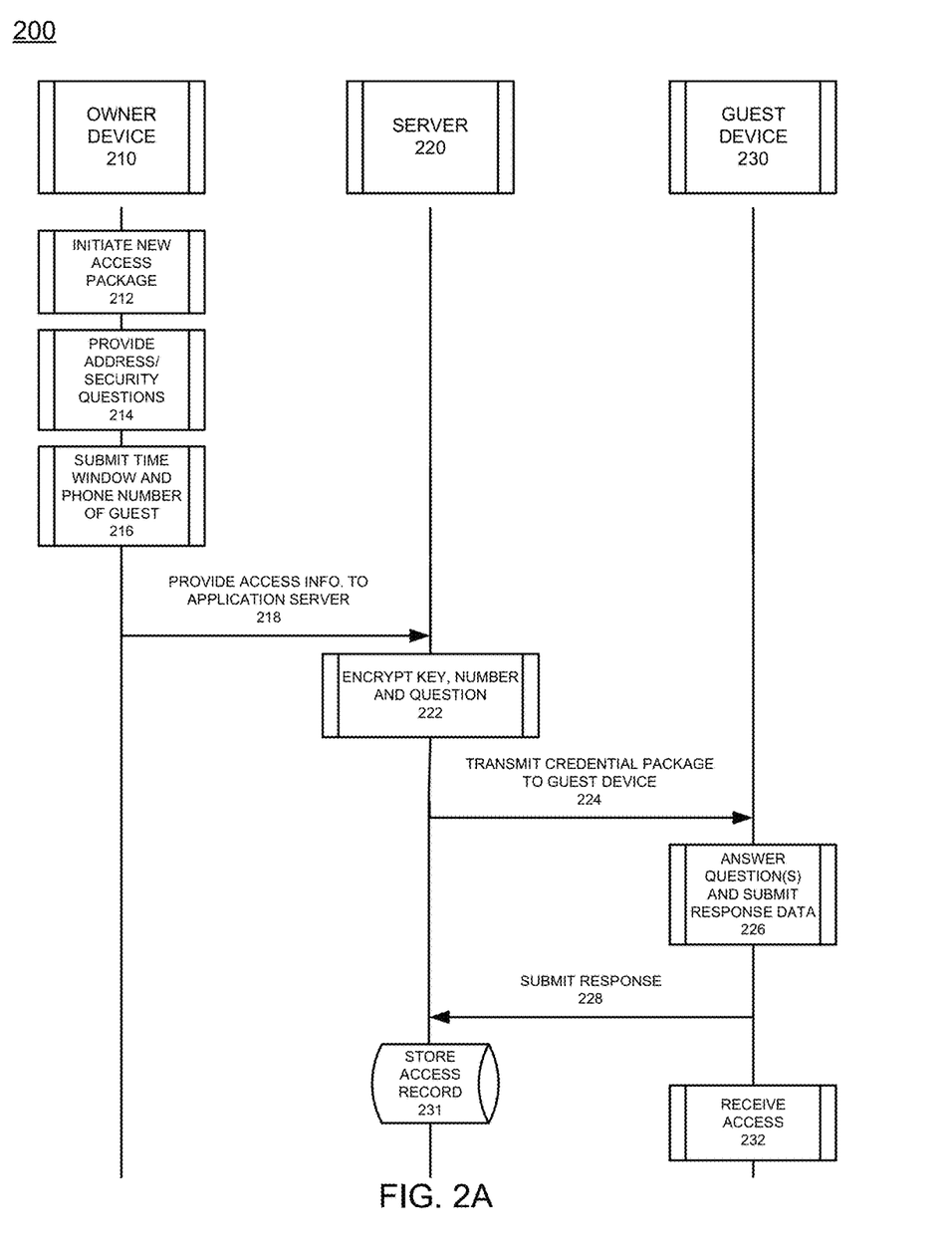
FIG. 2A illustrates a system signaling diagram of various processes and communication operations during an access assignment and access attempt according to an example embodiment.

FIG. 2A illustrates a system signaling diagram of various processes and communication operations during an access operation according to an example embodiment. Referring to FIG. 2A, the diagram 200 includes a communication cycle between the owner device 210, the server 220 and the guest device 230. In operation, the owner device 210 logs onto the management web site hosted by the server 220 and configures a temporary access package 212 for a guest device seeking access to enter the property with a specific appointment and credentials. In another embodiment, the owner device 210 may access an application from the server 220, or another device communicably coupled to the server or the owner device, to configure the temporary access package 212. A user of the device 210 can provide the address of the property so that GPS coordinates, or other location attributes, can be used to set the location of the property. In another embodiment, the device 210, if in or on or proximate the premises, can indicate the location via an action such as turning on a location feature on the device 210.

Security questions that should be answered, or other security actions that should be properly concluded (such as biometric verification, voice verification, visual verification, etc.) are submitted 214 along with a time window for access and a phone number (or other data such as an IP address, etc.) of the guest device 216. This information may be submitted 218 to the server 220 for processing. The parameter 'LL' may be used for location. The server 220 permits the owner device 210 to create security questions and answers and/or other security actions for a specific guest. The answer to the question(s) or other security action(s) may be denoted 'R'. The server 220 permits the owner device 210 to also setup an appointment or appointment window denoted 'T'. The guest user device 230 will access his/her application and send the serial number, SN' of the phone (or other identifier) to the server 220. A website, application, service, or program, running on the server 220, or a website, application, service, or program running on the device 210, can send an access or credential package or message 224 to the guest's device 230 which would be running a website, application, service, or program able to receive the message, parse the message and perform an action(s) based on the message. The package or message 224 includes encrypted data 222=Encrypt (K, R.SN), where R.SN is a string (such as a concatenated string) of the challenge response answer and the serial number or other identifier of the device 230. The package 224 is delivered to the guest device 230 and received by an application running on the device. A display (or a speaker) on the guest device 230 provides a message that the premises may be accessed on the given date/time. As a result, on the given date, the device 230 is at or proximate the residence, and if the time of day 'T' is within the time window and the device is in the proper location 'LL', the challenge question is able to be answered 226. The challenge response is concatenated with the serial number or other identifier of the device 230, as well as a decryption key 'K'. The response data 228 is sent to the server 220 where the data is stored 231, for example in a user profile. The key 'K', will be transmitted over a communication protocol such as Wi-Fi, BLUETOOTH, NFC, cellular, etc., from the guest device 230 (via a transmitter or transceiver, for example) to a receiver or transceiver on the, or communicably coupled to, the door lock which would unlock 232. This key may expire after a certain amount of time or after a certain action is taken (for example, after the lock is unlocked one or more times).

According to example embodiments, a property owner, tenant or other individual prepares an access package via their computing device which will permit a visitor computing device to access the property based on specified conditions being met. The visitor retrieves an access package (which includes an encrypted key) and may proceed to enter the property. The owner can provide a key to guests based on certain conditions being met and using a secure operation. Examples of the various security factors include time of day 'T', challenge response 'R', serial number of guest's phone, 'SN', pre-shared key, 'K', and key encryption methods (standard encryption routines).

Figure 2B:
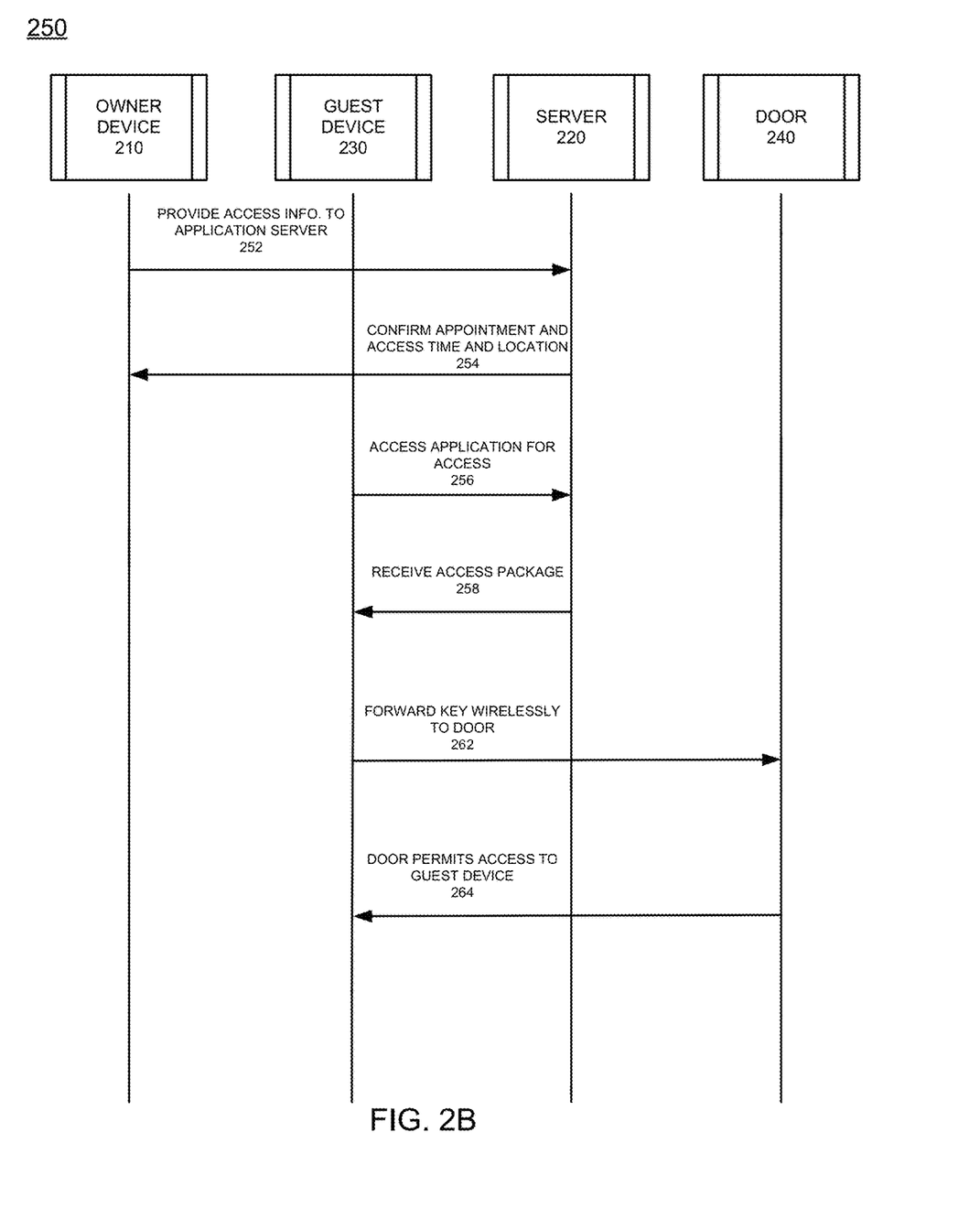
FIG. 2B illustrates a system signaling diagram of various processes and communication operations during an access assignment and access attempt according to an example embodiment.

FIG. 2B illustrates a system signaling diagram of various processes and communication operations during an access operation according to an example embodiment. Referring to FIG. 2B, the example diagram 250 includes the owner device 210 logging into the management web site 252 running on the server 220 (or using an application running on the device 210) to access the server) where he/she may configure a temporary access package for a guest who needs to enter the property with a specific appointment. The owner device 210 provides the address of the property so that GPS coordinates 'LL' may be determined and used to ensure the correct guest device. The web site or application permits the owner to create security questions and answers 'R' for a specific guest device 230. The web site permits the owner to set up an appointment or appointment window 'T' as a necessary variable which must be fulfilled to enter the house.

The server 220 confirms the access package details 254 and the appointment is confirmed by the server 220. The application can then be accessed 256 by the guest device 230 which will send the serial number or other identifier, SN of the phone to the website or application running on the server 220 (or another device communicably coupled to the server or to the guest device 230). The server 220 sends an access package 258 to the guest's smartphone application which consists of, in one embodiment, package=Encrypt (K, R.SN), where R.SN is the concatenated string of the challenge response answer and the serial number of the smartphone. The credentials package is delivered to the application running on the guest device 230, and a message is sent regarding the date/window of time the premises may be accessed. On the given date/time, if the time of day T is within the appointment window and the phone is in the right location, LL (as per the GPS receiver, for example) the user is prompted to answer the challenge question. When the answer is provided, it is concatenated with the serial number of the phone. This concatenation of the serial number and the answer can be used to decrypt the access package and the lock key becomes available. The key K, will be transmitted over a wireless protocol 262 to the lock 240 and the door will open 264. This key may expire after a certain amount of time or after a certain action is taken (for example, after the lock is unlocked one or more times).

Optionally, the configuration may only permit access to the property if a specific guest device (as determined by a device identifier) or if multiple users were present for any lock to open. For instance, if a property owner wants a person to chaperone a guest. This scenario is common with real estate agents and contractors or prospective renters or purchasers who need access to a property. In such a scenario one or more of the following would occur: both devices of both parties would pair with one or more locks in or on the property, both devices would be in the same or similar location, both devices may receive questions or other security actions and both may have a limited time window to access the door lock. Some package access messages do not need to include all of these attributes: 'T' (time of day/week), 'R' (Challenge question response), SN' (serial number of guest's phone) and 'K' (pre-shared key). For example, 'T' can be excluded because one of the devices may already have a record of the time or the 'smart' door lock could have a record of the time.

Figure 2C:
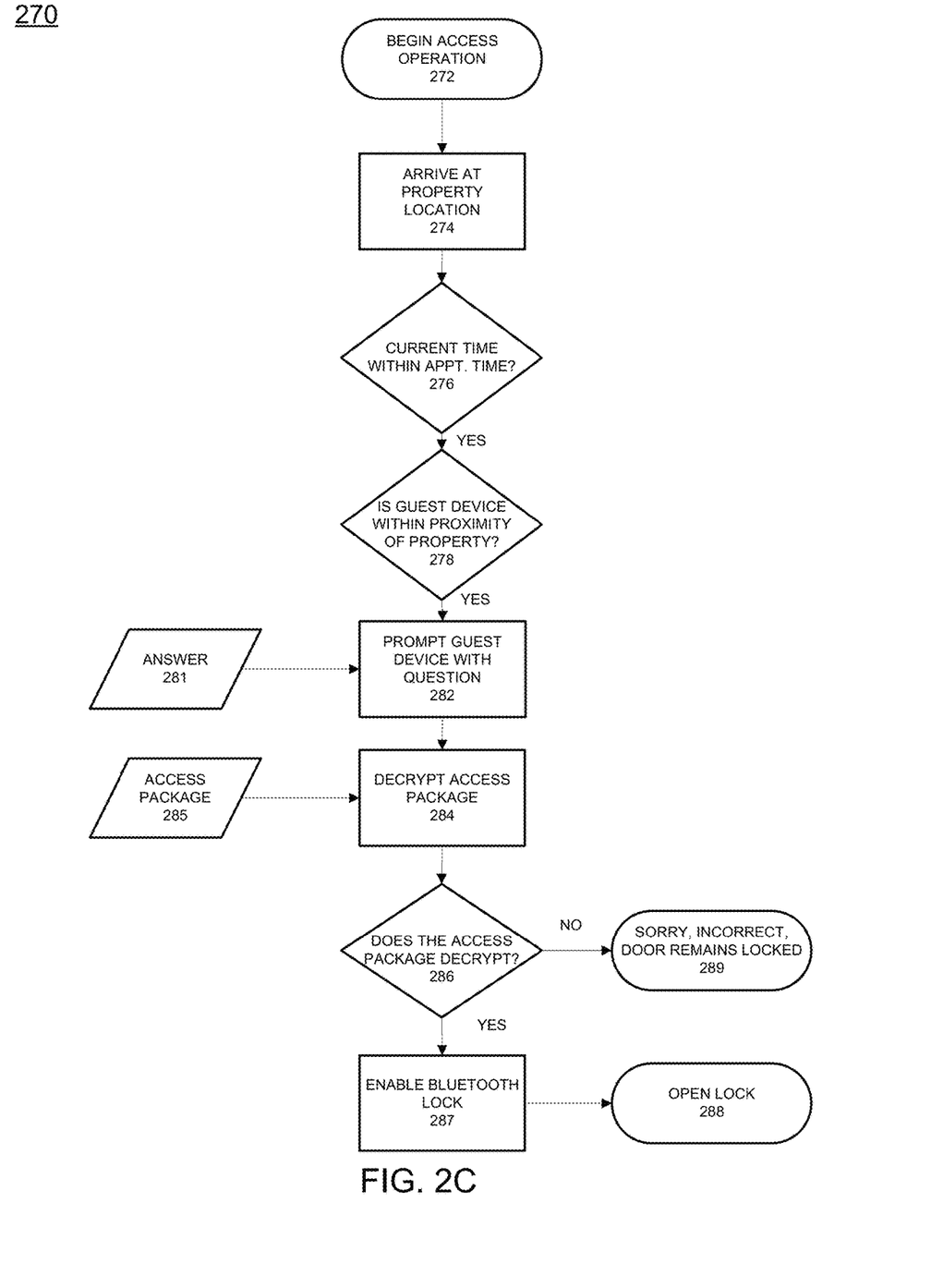
FIG. 2C illustrates a system signaling diagram of various processes and communication operations during an access assignment and access attempt according to an example embodiment.

FIG. 2C illustrates a diagram of various processes and communication operations during an access operation according to an example embodiment. Referring to FIG. 2C, the flow diagram 270 includes a set of operations regarding the guest user device attempting to access the wirelessly controlled door lock. For example, the procedure begins 272 with a user device arriving at the door location 274. The current time is analyzed against the authorized time for the user device to access the door 276 and if the current time is within the access time, then the process continues and a location of the guest device is obtained and compared to the location of the door for another comparison operation 278. If the current time is not within the access time, a notification is sent to the guest device. If the guest device is within the location then the device may be prompted with a question(s) and/or other security actions for additional security measures 282. Assuming the correct answer is submitted and/or other security actions are successfully completed 281 then the access package 285 may be decrypted 284 with a known key. If the decryption key fails 286, the door lock will not be unlocked and the door will not be opened 289. However, if the decryption is successful 286 then the door be enabled by a wireless communication signal sent from the guest device to the door lock 287 (for example, via Bluetooth) and the door will open 288.

Figure 2D:
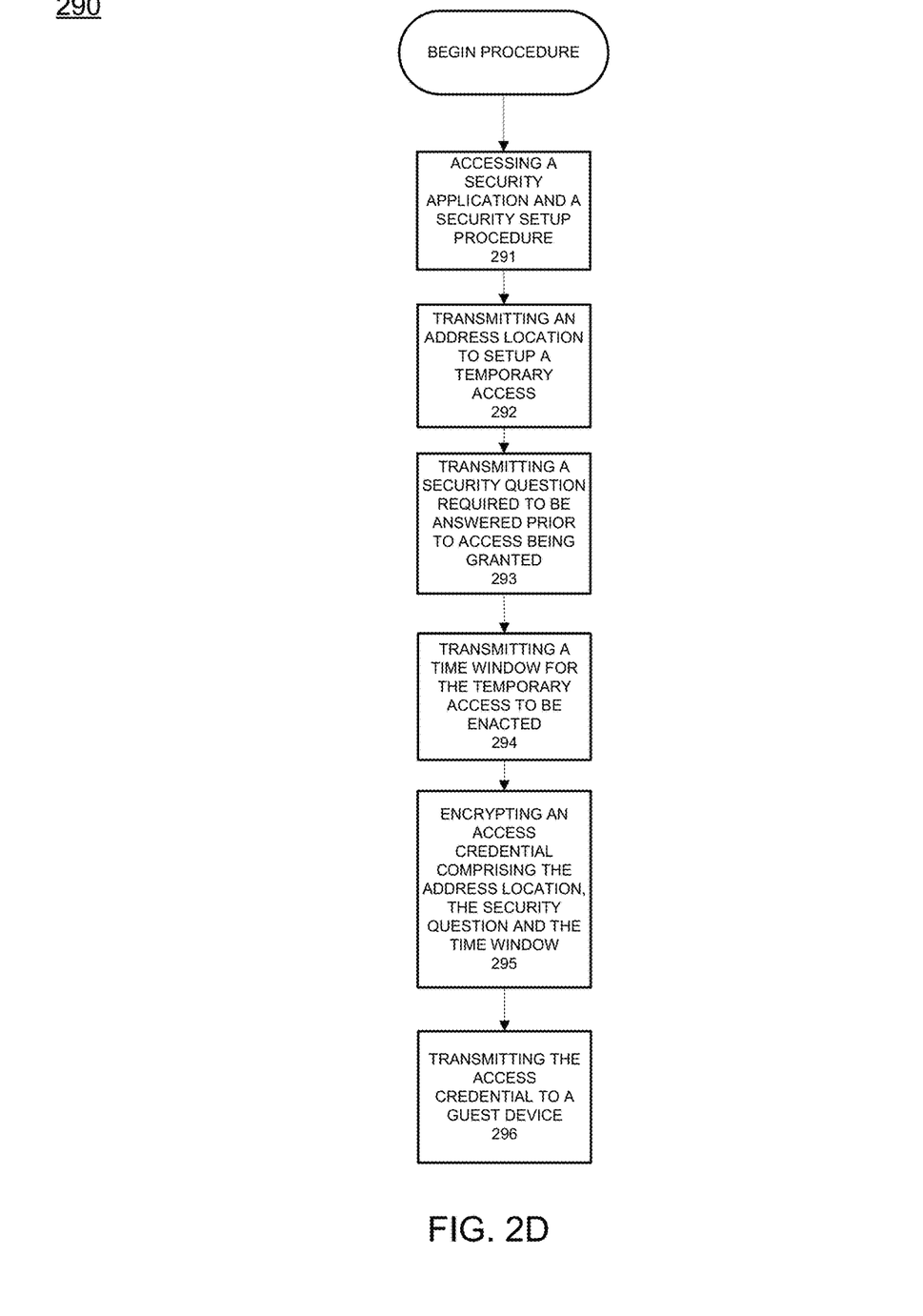
FIG. 2D illustrates an example flow diagram of a method of operation according to example embodiments.

FIG. 2D includes an example flow diagram 290 of an example method of operation which includes accessing a security application and a security setup procedure 291, transmitting an address location to setup a temporary access 292, transmitting a security question required to be answered prior to access being granted 293, transmitting a time window for the temporary access to be enacted 294, encrypting an access credential comprising the address location, the security question and the time window 295 and transmitting the access credential to a guest device 296 so the guest device can be used to access and open the lock.

Figure 3:
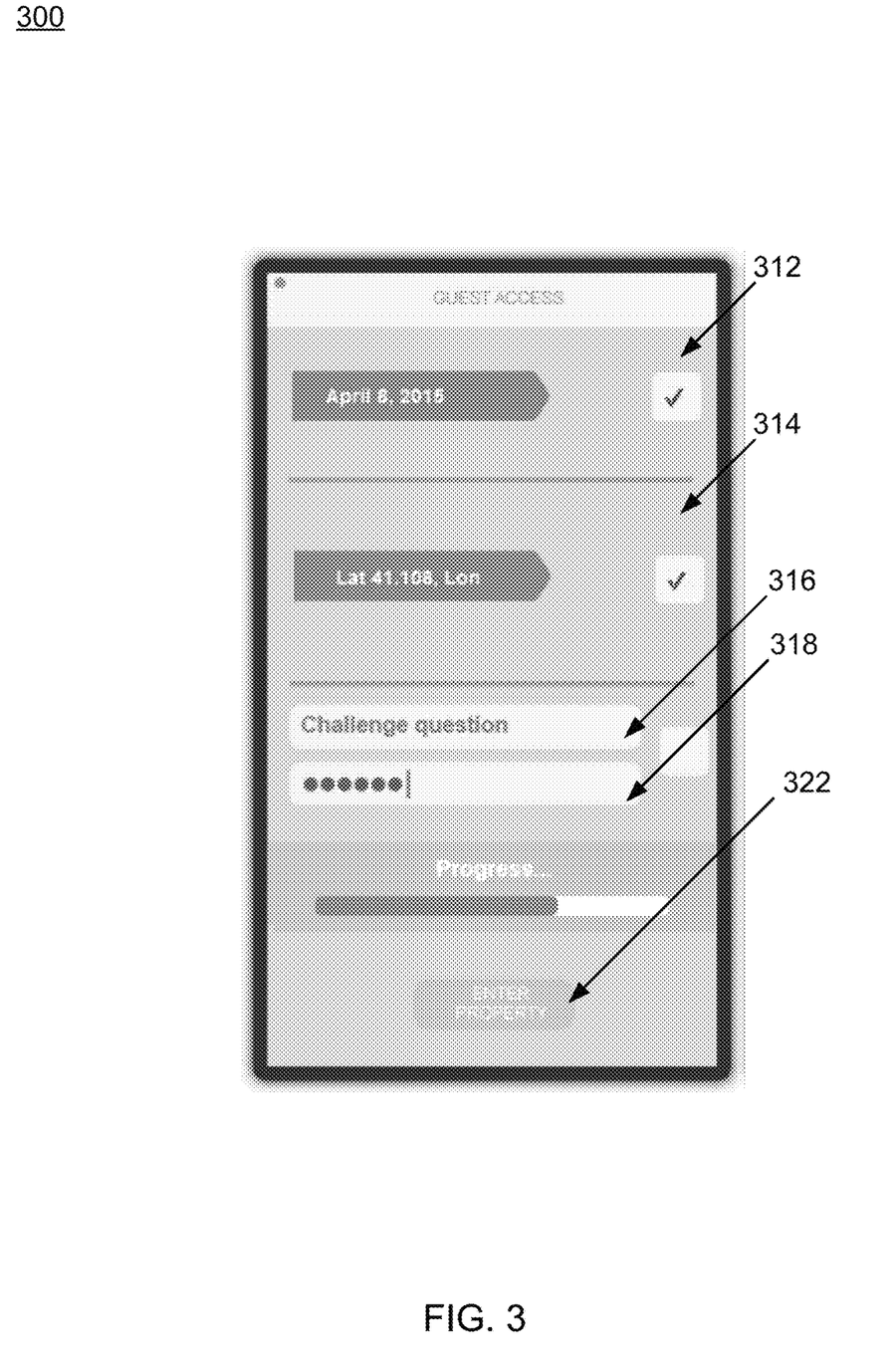
FIG. 3 illustrates a user interface of a guest mobile device during an access attempt according to example embodiments.

FIG. 3 illustrates a user interface of a guest mobile device during an access attempt according to example embodiments. Referring to FIG. 3, the guest user interface 300 includes a date for access to begin 312, a GPS coordinate position of the premises 314, a challenge question 316 and an answer section 318 and a button to access the premises 322. The guest may access the application and enter the property via the wireless communication protocol and the proper credentials.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 4 illustrates an example network element 400, which may represent or be integrated in any of the above-described components, etc.

Figure 4:
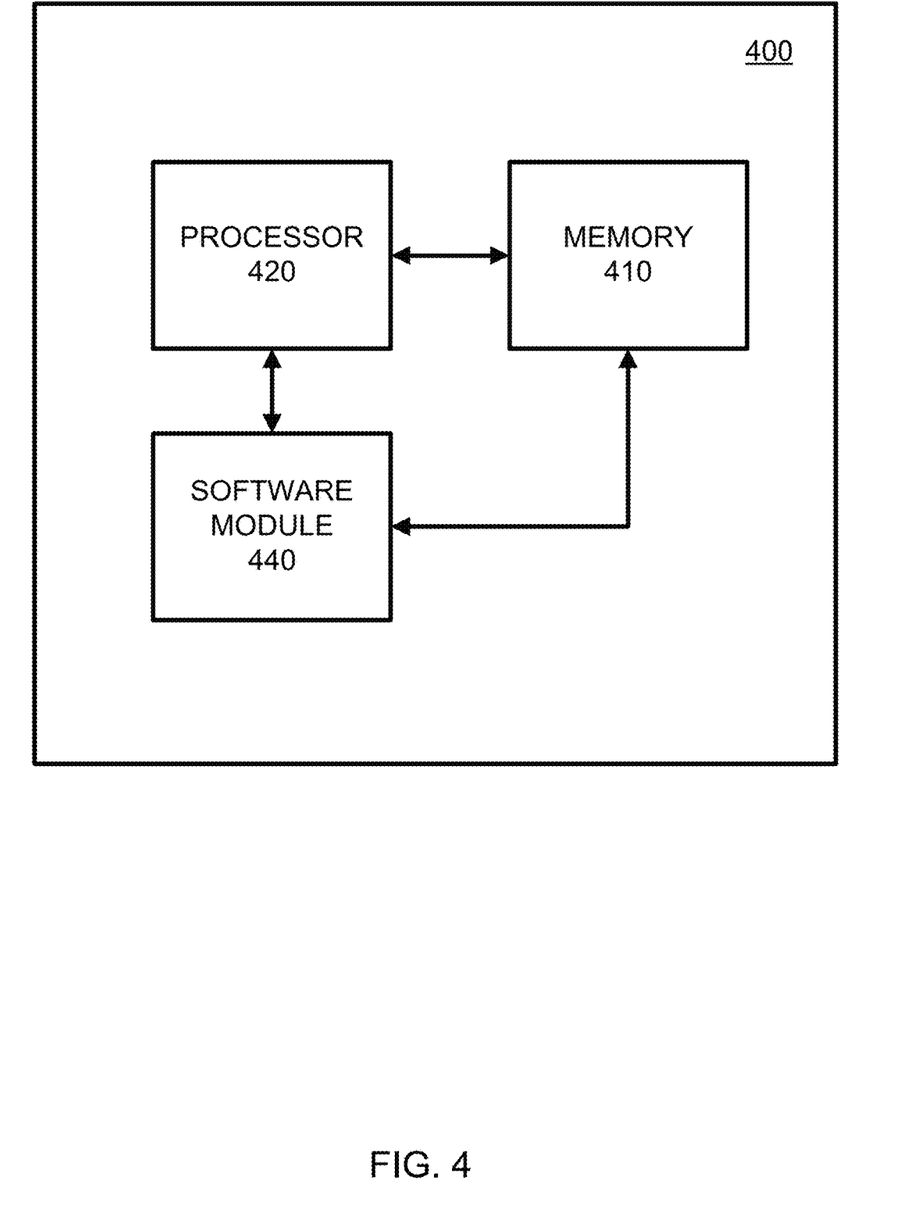
FIG. 4 illustrates a computer readable medium and non-transitory computer processing platform for performing procedures according to example embodiments of the present application.

As illustrated in FIG. 4, a memory 410 and a processor 420 may be discrete components of a network entity 400 that are used to execute an application or set of operations as described herein. The application may be coded in software in a computer language understood by the processor 420, and stored in a computer readable medium, such as, a memory 410. The computer readable medium may be a non-transitory computer readable medium that includes tangible hardware components, such as memory, that can store software. Furthermore, a software module 430 may be another discrete entity that is part of the network entity 400, and which contains software instructions that may be executed by the processor 420 to effectuate one or more of the functions described herein. In addition to the above noted components of the network entity 400, the network entity 400 may also have a transmitter and receiver pair configured to receive and transmit communication signals (not shown).

Figure 5A:
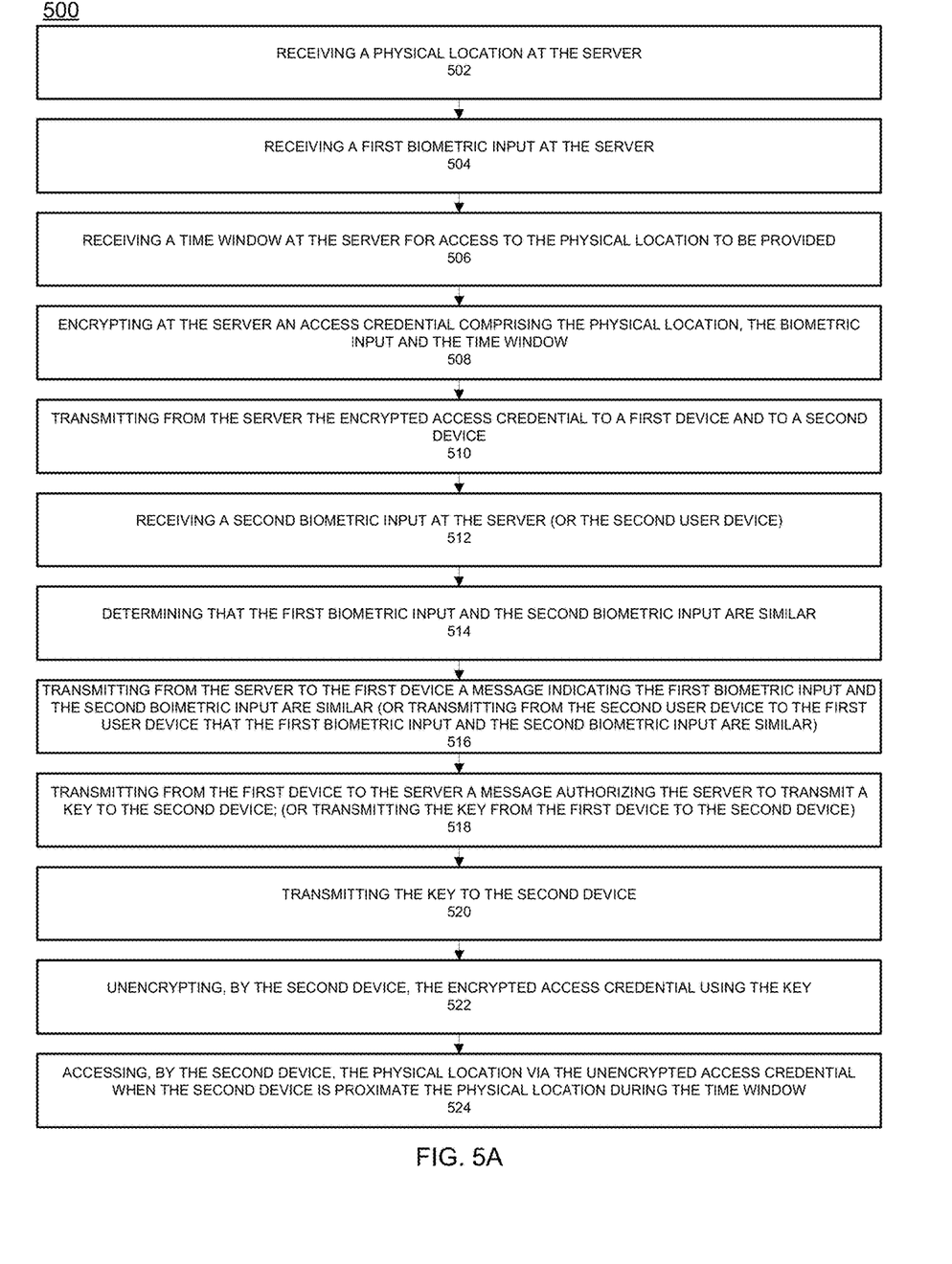
FIGS. 5A-5D illustrate yet another example flow diagram according to an example embodiment of the present application.

FIG. 5A illustrates another example flow diagram according to an example embodiment of the present application. Referring to FIG. 5A, the diagram 500 includes one or more of: receiving a physical location at a server 502, receiving a first biometric input at the server 504, receiving a time window at the server for access to the physical location to be provided 506, encrypting at the server an access credential comprising the physical location, the biometric input and the time window 508, transmitting from the server the encrypted access credential to a first device and to a second device 510, receiving a second biometric input at the server (or the second user device) 512, determining that the first biometric input and the second biometric input are similar 514, transmitting from the server to the first device a message indicating the first biometric input and the second biometric input are similar (or transmitting from the second user device to the first user device that the first biometric input and the second biometric input are similar) 516, transmitting from the first device to the server a message authorizing the server to transmit a key to the second device (or transmitting the key from the first device to the second device) 518, transmitting the key to the second device 520, unencrypting, by the second device, the encrypted access credential using the key 522, accessing, by the second device, the physical location via the unencrypted access credential when the second device is proximate the physical location during the time window 524.

Figure 5B:
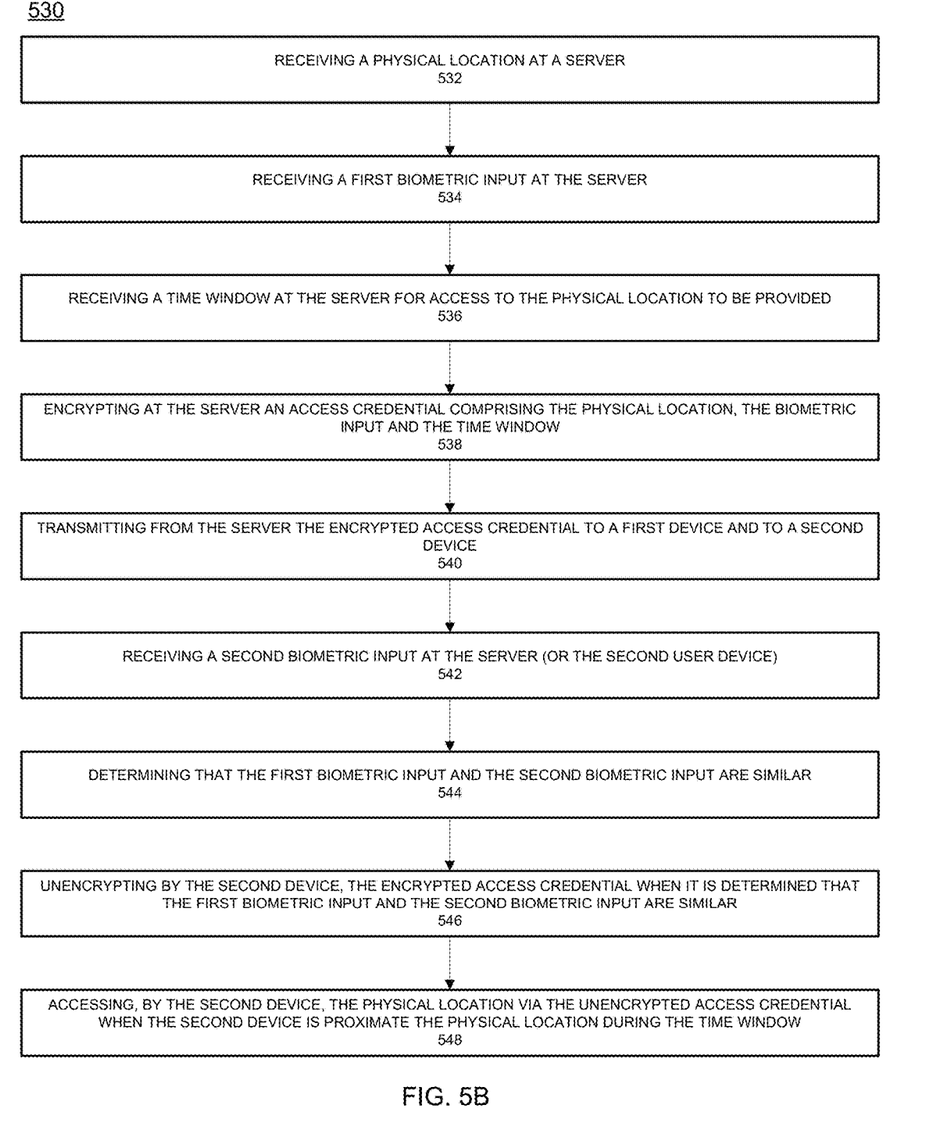

Referring to FIG. 5B, the diagram 530 includes one or more of: receiving a physical location at a server 532, receiving a first biometric input at the server 534, receiving a time window at the server for access to the physical location to be provided 536, encrypting at the server an access credential comprising the physical location, the biometric input and the time window 538, transmitting from the server the encrypted access credential to a first device and to a second device 540, receiving a second biometric input at the server (or the second user device) 542, determining that the first biometric input and the second biometric input are similar 544 unencrypting, by the second device, the encrypted access credential when it is determined that the first biometric input and the second biometric input are similar 546, accessing, by the second device, the physical location via the unencrypted access credential when the second device is proximate the physical location during the time window 548.

Figure 5C:
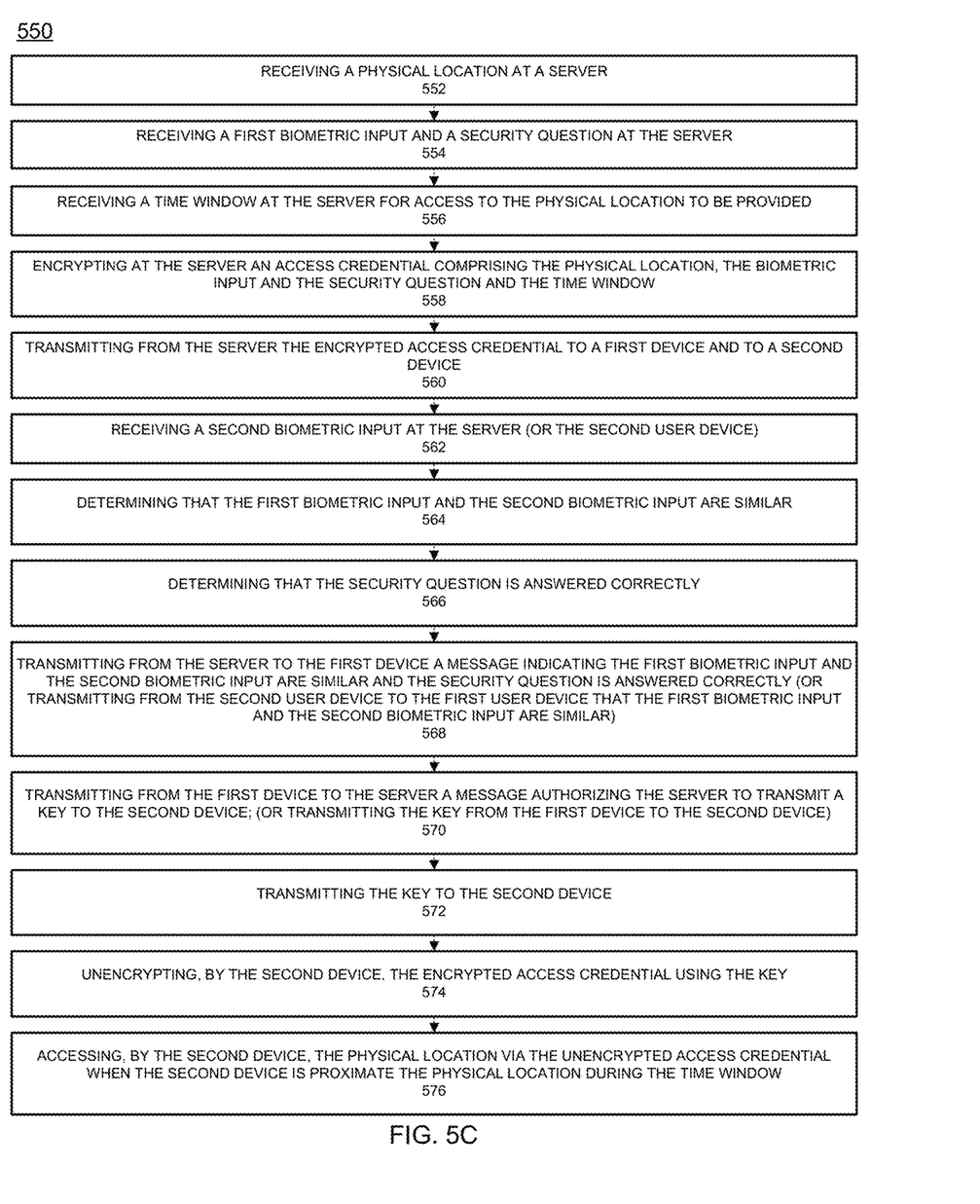

Referring to FIG. 5C, the diagram 550 includes one or more of: receiving a physical location at a server 552, receiving a first biometric input and a security question at the server 554, receiving a time window at the server for access to the physical location to be provided 556, encrypting at the server an access credential comprising the physical location, the biometric input, the security question and the time window 558, transmitting from the server the encrypted access credential to a first device and to a second device 560, receiving a second biometric input at the server (or the second user device) 562, determining that the first biometric input and the second biometric input are similar 564, determining that the security question is answered correctly 566, transmitting from the server to the first device a message indicating the first biometric input and the second biometric input are similar and the security question is answered correctly (or transmitting from the second user device to the first user device that the first biometric input and the second biometric input are similar) 568, transmitting from the first device to the server a message authorizing the server to transmit a key to the second device (or transmitting the key from the first device to the second device) 570, transmitting the key to the second device 572, unencrypting, by the second device, the encrypted access credential using the key 574, accessing, by the second device, the physical location via the unencrypted access credential when the second device is proximate the physical location during the time window 576.

Figure 5D:
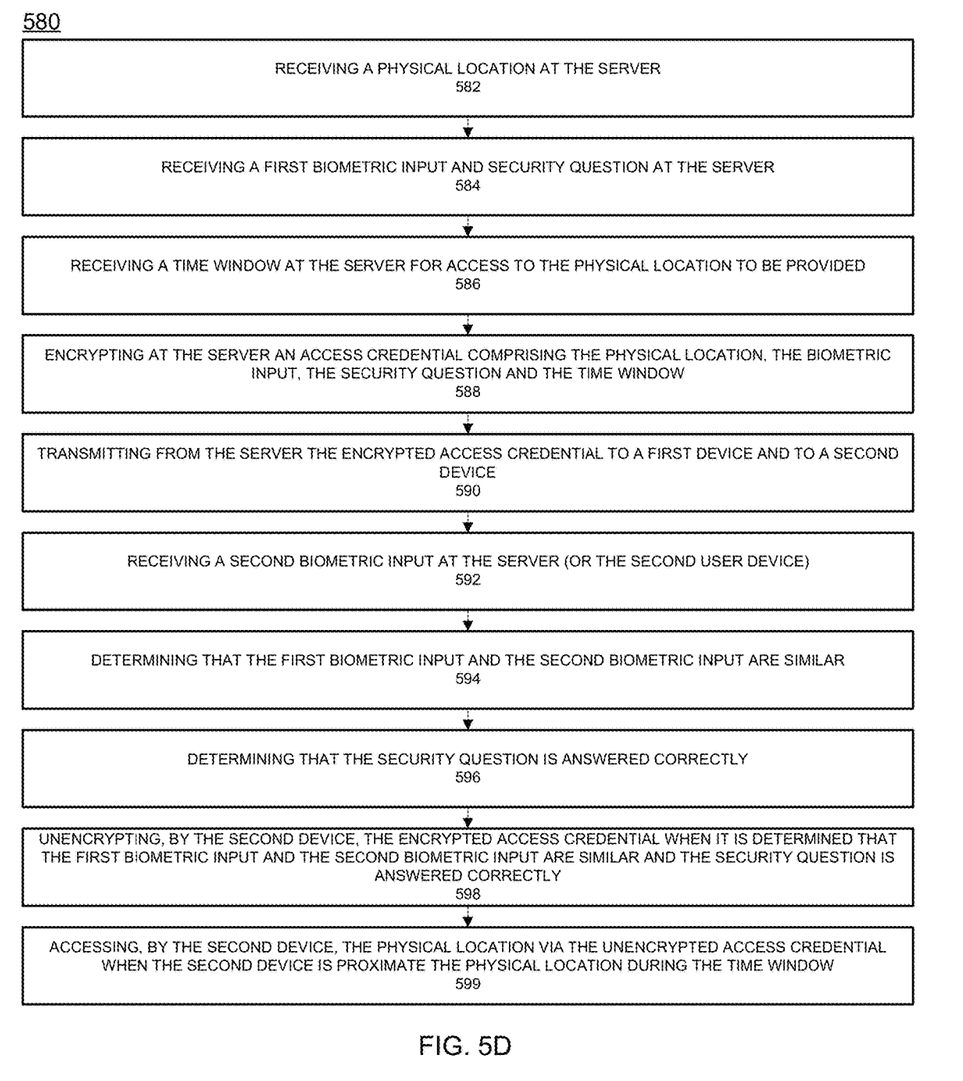

Referring to FIG. 5D, the diagram 580 includes one or more of: receiving a physical location at a server 582, receiving a first biometric input and a security question at the server 584, receiving a time window at the server for access to the physical location to be provided 586, encrypting at the server an access credential comprising the physical location, the biometric input, the security question and the time window 588, transmitting from the server the encrypted access credential to a first device and to a second device 590, receiving a second biometric input at the server (or the second user device) 592, determining that the first biometric input and the second biometric input are similar 594, determining that the security question is answered correctly 596, unencrypting, by the second device, the encrypted access credential when it is determined that the first biometric input and the second biometric input are similar and the security question is answered correctly 598, accessing, by the second device, the physical location via the unencrypted access credential when the second device is proximate the physical location during the time window 599.

Figure 6:
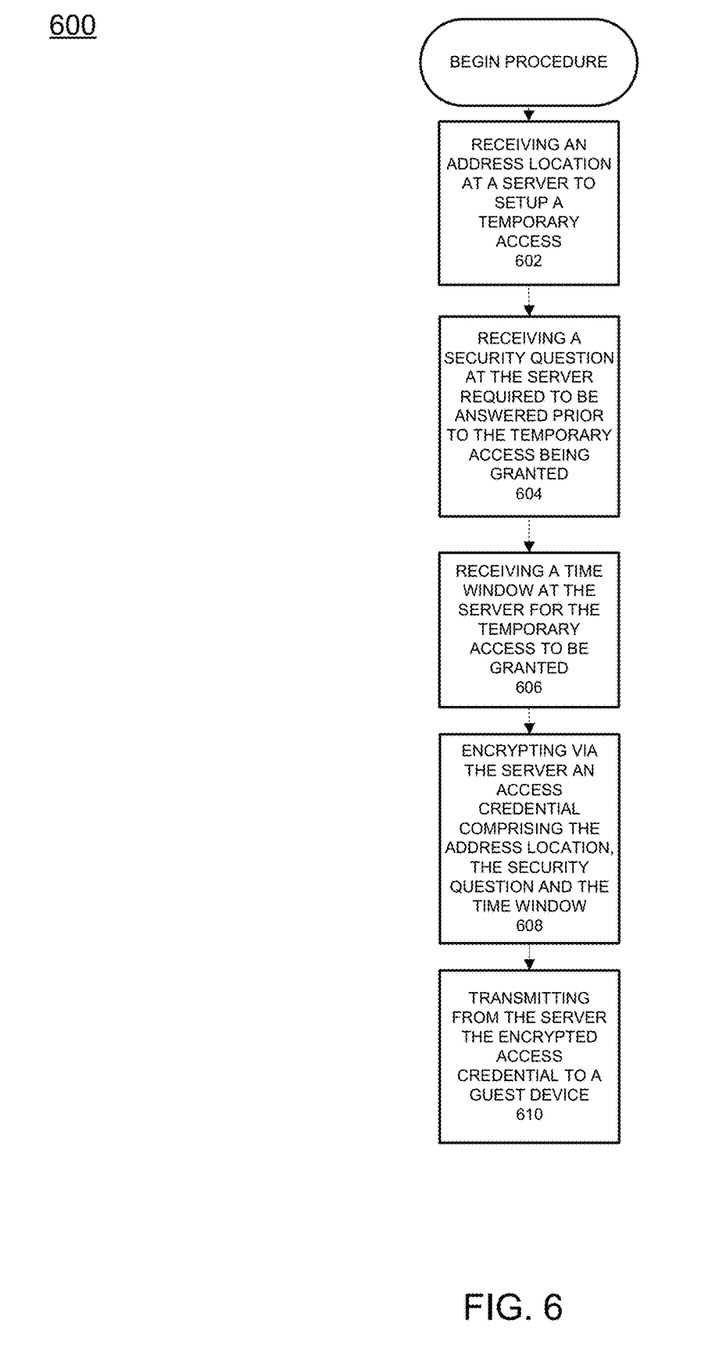
FIG. 6 illustrates a further example flow diagram according to an example embodiment of the present application.

FIG. 6 illustrates another example flow diagram according to an example embodiment of the present application. Referring to FIG. 6, the diagram 600 includes one or more of: receiving an address location at a server to setup a temporary access 602, receiving a security question at the server required to be answered prior to the temporary access being granted 604, and receiving a time window at the server for the temporary access to be granted 606. Once all necessary information is received to establish the credential, the application may include encrypting via the server an access credential comprising the address location, the security question and the time window 608 and transmitting from the server the encrypted access credential to a guest device 610.

In other embodiments, a method comprises one or more of: receiving an address location at a server to setup a temporary access, receiving a biometric input at the server required to be verified prior to the temporary access being granted, receiving a time window at the server for the temporary access to be granted, encrypting at the server an access credential comprising the address location, the biometric input and the time window, and transmitting from the server the encrypted access credential to a device of the first user and to a device of the second user.

In further embodiments, a method comprises one or more of: receiving an address location at a server to setup a temporary access, receiving a biometric input and a security question at the server required to be verified prior to the temporary access being granted, wherein the biometric input is verified for a first user and the security question is verified for a second user, receiving a time window at the server for the temporary access to be granted, encrypting at the server an access credential comprising the address location, the biometric input, the security question and the time window and transmitting from the server the encrypted access credential to a device of the first user and to a device of the second user.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   receiving an address location at a server to setup a temporary access;
   receiving a security question at the server required to be answered prior to the temporary access being granted;
   receiving a time window at the server for the temporary access to be granted;

encrypting at the server an access credential based on the address location, the security question and the time window; and transmitting from the server the encrypted access credential to a guest device, wherein the encrypted access credential is based on an answer to the security question and a serial number of the guest device.

2. The method of claim 1, wherein the encrypted access credential further comprises a concatenated string of the answer to the security question and the serial number of the guest device.

3. The method of claim 1, further comprising requiring a plurality of guest devices to be present at the address location prior to granting the temporary access to the guest device to access the address location.

4. The method of claim 3, wherein granting the temporary access to the guest device to access address location comprises at least one of unlocking and locking an electronic door lock using a wireless communication protocol.

5. The method of claim 4, wherein the wireless communication protocol comprises at least one of BLUETOOTH, Wi-Fi, cellular and near field communication (NFC).

6. The method of claim 1, further comprising transmitting an encryption key to the guest device from the server responsive to the guest device transmitting a correct response to the security question.

7. The method of claim 1, wherein the address location comprises global positioning system (GPS) coordinates.

8. An apparatus, comprising:
a receiver configured to:
receive an address location to setup a temporary access;
receive a security question required to be answered prior to the temporary access being granted; and
receive a time window for the temporary access to be granted;
a processor configured to encrypt an access credential based on the address location, the security question and the time window; and
a transmitter configured to transmit the encrypted access credential to a guest device wherein the encrypted access credential is based on an answer to the security question and a serial number of the guest device.

9. The apparatus of claim 8, wherein the encrypted access credential further comprises a concatenated string of the answer to the security question and the serial number of the guest device.

10. The apparatus of claim 8, wherein the processor requires a plurality of guest devices to be present at the address location prior to the temporary access being granted to the guest device to access the address location.

11. The apparatus of claim 10, wherein the processor grants the temporary access to the guest device to access address location via access to perform at least one of unlock and lock an electronic door lock using a wireless communication protocol.

12. The apparatus of claim 11, wherein the wireless communication protocol comprises at least one of BLUETOOTH, Wi-Fi, cellular and near field communication (NFC).

13. The apparatus of claim 8, wherein the transmitter is further configured to transmit an encryption key to the guest device responsive to the guest device having transmitted a correct response to the security question.

14. The apparatus of claim 8, wherein the address location comprises global positioning system (GPS) coordinates.

15. A non-transitory computer readable storage medium configured to store instructions that when executed cause a processor to perform:
receiving an address location at a server to setup a temporary access;
receiving a security question at the server required to be answered prior to the temporary access being granted;
receiving a time window at the server for the temporary access to be granted;
encrypting via the server an access credential based on the address location, the security question and the time window; and
transmitting from the server the encrypted access credential to a guest device, wherein the encrypted access credential is based on an answer to the security question and a serial number of the guest device.

16. The non-transitory computer readable storage medium of claim 15, wherein the encrypted access credential further comprises a concatenated string of the answer to the security question and the serial number of the guest device.

17. The non-transitory computer readable storage medium of claim 15, wherein the processor is further configured to perform requiring a plurality of guest devices to be present at the address location prior to granting temporary access to the guest device to access the address location.

18. The non-transitory computer readable storage medium of claim 17, wherein granting the temporary access to the guest device to access the address location comprises at least one of unlocking and locking an electronic door lock using a wireless communication protocol, and wherein the address location comprises global positioning system (GPS) coordinates.

19. The non-transitory computer readable storage medium of claim 18, wherein the wireless communication protocol comprises at least one of BLUETOOTH, Wi-Fi, cellular and near field communication (NFC).

20. The non-transitory computer readable storage medium of claim 15, wherein the processor is further configured to perform transmitting an encryption key to the guest device from an application server responsive to the guest device transmitting a correct response to the security question.

* * * * *